US012738498B2

(12) United States Patent
Wang et al.

(10) Patent No.: US 12,738,498 B2
(45) Date of Patent: Sep. 15, 2026

(54) LITHIUM SUPPLEMENT FOR LITHIUM SECONDARY BATTERY, PREPARATION METHOD THEREOF, AND LITHIUM SECONDARY BATTERY, BATTERY MODULE, BATTERY PACK, AND APPARATUS

(71) Applicant: CONTEMPORARY AMPEREX TECHNOLOGY (HONG KONG) LIMITED, Hong Kong (CN)

(72) Inventors: Bangrun Wang, Ningde (CN); Na Liu, Ningde (CN); Chengdu Liang, Ningde (CN); Yongchao Liu, Ningde (CN); Xin Sun, Ningde (CN); Haotian Xie, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 957 days.

(21) Appl. No.: 18/074,416

(22) Filed: Dec. 2, 2022

(65) Prior Publication Data

US 2023/0207812 A1 Jun. 29, 2023

Related U.S. Application Data

(63) Continuation of application No. PCT/CN2020/131475, filed on Nov. 25, 2020.

(51) Int. Cl.
*H01M 4/62* (2006.01)
*C01G 53/50* (2025.01)
(Continued)

(52) U.S. Cl.
CPC .............. *H01M 4/62* (2013.01); *C01G 53/50* (2013.01); *H01M 4/131* (2013.01); *H01M 4/525* (2013.01);
(Continued)

(58) Field of Classification Search
CPC ........ H01M 4/62; H01M 4/131; H01M 4/525; H01M 10/052; H01M 2004/028;
(Continued)

(56) References Cited

U.S. PATENT DOCUMENTS

2013/0244113 A1* 9/2013 Li ........................ H01M 4/131 429/231
2020/0136142 A1* 4/2020 Gowda ................ H01M 4/364

FOREIGN PATENT DOCUMENTS

CN 102569878 A 7/2012
CN 103493276 A 1/2014
CN 103718351 B 8/2016
CN 108232343 A 6/2018
(Continued)

OTHER PUBLICATIONS

International Search Report Written Opinion, PCT/CN2020/131475, Aug. 30, 2021, 9 pgs.
China National Intellectual Property Administration (CNIPA) Office Action 1 for Application No. 202080102730.6 Jun. 18, 2024 11 Pages (including translation).
(Continued)

*Primary Examiner* — Andrew J. Oyer
(74) *Attorney, Agent, or Firm* — ANOVA LAW GROUP, PLLC

(57) ABSTRACT

This application discloses a lithium supplement for lithium secondary batteries, a preparation method thereof, and a lithium secondary battery, a battery module, a battery pack, and an apparatus. Tests show that the lithium supplement of this application can maintain its own stability and low metal dissolution during long-term use of lithium secondary batteries, effectively improving energy density of lithium secondary batteries and ensuring a low self-discharge rate of lithium secondary batteries, thereby ensuring that the lithium secondary battery has high energy density, long cycle life, and high safety.

16 Claims, 6 Drawing Sheets

(51) Int. Cl.
*H01M 4/02* (2006.01)
*H01M 4/131* (2010.01)
*H01M 4/525* (2010.01)
*H01M 10/052* (2010.01)

(52) U.S. Cl.
CPC ....... *H01M 10/052* (2013.01); *C01P 2002/72* (2013.01); *H01M 2004/028* (2013.01)

(58) Field of Classification Search
CPC ...... H01M 4/364; H01M 4/366; H01M 4/485; H01M 4/505; H01M 4/5825; H01M 10/0525; C01G 53/50; C01P 2002/72; Y02E 60/10
See application file for complete search history.

(56) References Cited

FOREIGN PATENT DOCUMENTS

| | | | |
|---|---|---|---|
| CN | 108511697 | A | 9/2018 |
| CN | 110573459 | A | 12/2019 |
| CN | 111653770 | A | 9/2020 |
| JP | 3033899 | B1 | 4/2000 |

OTHER PUBLICATIONS

State Intellectual Property Office of China Notice of Grant for Application No. 202080102730.6 Mar. 27, 2025 7 pages (including translation).
The European Patent Office (EPO) The Extended European Search Report for 20962762.9 Nov. 16, 2023 8 Pages.

* cited by examiner

LITHIUM SUPPLEMENT FOR LITHIUM SECONDARY BATTERY, PREPARATION METHOD THEREOF, AND LITHIUM SECONDARY BATTERY, BATTERY MODULE, BATTERY PACK, AND APPARATUS

CROSS-REFERENCE TO RELATED APPLICATION

This application is a continuation application of PCT Patent Application No. PCT/CN2020/131475, entitled "LITHIUM COMPENSATION AGENT FOR LITHIUM SECONDARY BATTERY, PREPARATION METHOD FOR LITHIUM COMPENSATION AGENT, AND LITHIUM SECONDARY BATTERY, BATTERY MODULE, BATTERY PACK, AND DEVICE" filed on Nov. 25, 2020, which is incorporated herein by reference in its entirety.

TECHNICAL FIELD

This application pertains to the field of lithium secondary battery technologies, and relates to a lithium supplement for lithium secondary batteries, a preparation method thereof, and a related electric device, and in particular, to a lithium supplement for lithium secondary batteries, a preparation method thereof, and a lithium secondary battery, battery module, battery pack, and apparatus including such lithium supplement.

BACKGROUND

Lithium secondary batteries are widely used in various consumer electronic products due to their advantages such as high energy density, long cycle life, and zero memory effect. In recent years, with continuous development of electric vehicles and energy storage systems, requirements for energy density of lithium secondary batteries are also increasing.

Generally, the energy density of lithium secondary batteries is improved mainly by using high gram capacity active substances or high active substance packing rates, or reducing consumption of active lithium. However, the foregoing improvement approaches are often subjected to high cost, complicated process, or poor processability, which are not conducive to large-scale commercial application and cause huge safety hazards for actual production. In addition, such improvements have notable impact on safety performance of lithium secondary batteries.

Therefore, developing a method that can effectively improve the energy density of lithium secondary batteries and ensure their good safety performance while achieving high safety and low cost of their manufacture processes, has become a technical problem that needs to be resolved urgently for lithium secondary batteries.

SUMMARY

According to a first aspect, some embodiments of this application provide a lithium supplement for lithium secondary batteries, the lithium supplement includes a compound L having a molecular formula of $Li_xNi_aCu_{1-a-b}M_bO_2$, where $1 \leq x \leq 2$, $0<a<1$, and $0 \leq b<0.1$, and M is selected from one or more of Zn, Sn, Mg, Fe, and Mn.

An XRD pattern of the lithium supplement shows a first diffraction peak at a diffraction angle 2θ of 42°-44° and a second diffraction peak at a diffraction angle 2θ of 25°-27°. A diffraction intensity of the first diffraction peak is $I_1$, a diffraction intensity of the second diffraction peak is $I_2$, and $I_1/I_2<0.1\%$ holds.

The first diffraction peak corresponds to a diffraction peak of nickel oxide on a (200) crystal plane, and the second diffraction peak corresponds to a diffraction peak of the compound L on a (100) crystal plane.

Based on total weight of the lithium supplement, a percentage of free lithium contained in the lithium supplement is ≤5 wt %, in some embodiments, ≤3 wt %, and in some embodiments, ≤1 wt %.

The free lithium includes $Li_2CO_3$ and LiOH.

pH of the lithium supplement is denoted as $pH_L$, and $11 \leq pH_L \leq 13$ holds; and in some embodiments, $11.5 \leq pH_L \leq 12.5$.

A water concentration of the lithium supplement is not higher than 800 ppm, and in some embodiments, the water concentration of the lithium supplement is not higher than 300 ppm.

A median particle size by volume $D_v50$ of the lithium supplement is 2 μm-10 μm, and in some embodiments, the median particle size by volume $D_v50$ of the lithium supplement is 3 μm-6 μm.

In the molecular formula of the compound L, $0.1 \leq a \leq 0.9$; in some embodiments, $0.2 \leq a \leq 0.6$; and further in some embodiments, $0.2 \leq a \leq 0.4$.

The compound L is selected from $Li_2Ni_{0.1}Cu_{0.9}O_2$, $Li_2Ni_{0.2}Cu_{0.8}O_2$, $Li_2Ni_{0.3}Cu_{0.7}O_2$, $Li_2Ni_{0.4}Cu_{0.6}O_2$, $Li_2Ni_{0.5}Cu_{0.5}O_2$, $Li_2Ni_{0.6}Cu_{0.4}O_2$, $Li_2Ni_{0.7}Cu_{0.3}O_2$, $Li_2Ni_{0.8}Cu_{0.2}O_2$, $Li_2Ni_{0.9}Cu_{0.1}O_2$, or $Li_2Ni_{0.4}Cu_{0.55}Mg_{0.05}O_2$.

The lithium supplement further includes a coating layer on at least partial surface of the compound L, and a substance of the coating layer is selected from one or more of metal fluorides, oxides, and phosphates; in some embodiments, the metal fluoride is selected from $AlF_3$; the oxide is selected from one or more of $V_2O_5$, $Al_2O_3$, $ZrO_2$, $TiO_2$, ZnO, $SiO_2$, and $B_2O_3$; and the phosphate is selected from $AlPO_4$, $FePO_4$, $Co_3(PO_4)_2$, and $Ni_3(PO_4)_2$.

According to a second aspect, some embodiments of this application further provide a preparation method of the foregoing lithium supplement for lithium secondary batteries, including the following steps:

S1: weighing a lithium source, a nickel source, a copper source, and an M source, and mixing them and then performing ball milling, where a molar ratio of Li, Ni, Cu, and M is c:a:(1-a-b):b, $2 \leq c \leq 3$, $0<a<1$, and $0 \leq b<0.1$, and M is selected from one or more of Zn, Sn, Mg, Fe, and Mn; and S2: sintering the ball-milled mixture to obtain the lithium supplement.

In S1, $2.1 \leq c \leq 2.7$ and $0.1 \leq a \leq 0.9$; in some embodiments, $2.2 \leq c \leq 2.6$ and $0.2 \leq a \leq 0.6$; and further in some embodiments, $0.2 \leq a \leq 0.4$.

In S2, the sintering satisfies at least one of the following conditions:

(1) a temperature rise rate is 1° C./min-10° C./min; and in some embodiments, the temperature rise rate is 3° C./min-5° C./min;

(2) a sintering temperature is 600° C.-800° C.; and in some embodiments, the sintering temperature is 650° C.-750° C.; and (3) a temperature hold time is 5 h-20 h; and in some embodiments, the temperature hold time is 6 h-10 h.

In some embodiments, the method further includes the following step:

S3: crushing and grading the sintered product obtained in S2 to obtain a graded product with a median particle size $D_v50$ of 2 μm-10 μm, where in some embodiments, a median particle size by volume $D_v50$ of the graded product is 3 μm-6 μm.

In some embodiments, the method further includes the following steps:

S4: washing the graded product of S3 with absolute ethanol or isopropanol for a wash time of 0 h-2 h, and in some embodiments, 0.2 h-1.5 h; and S5: drying or infrared heating the washed product under vacuum or an inert atmosphere, where optionally, the inert atmosphere includes nitrogen or argon, and a temperature for the drying or infrared heating is 100° C.-200° C., and a time for the drying or infrared heating is 2 h-12 h.

In some embodiments, the method further includes the following step:

S6: ball-milling and coating the lithium supplement with a coating material, where the coating material is selected from one or more of metal fluorides, oxides, and phosphates.

The metal fluoride is selected from $AlF_3$; the oxide is selected from one or more of $V_2O_5$, $Al_2O_3$, $ZrO_2$, $TiO_2$, ZnO, $SiO_2$, and $B_2O_3$; and the phosphate is selected from one or more of $AlPO_4$, $FePO_4$, $Co_3(PO_4)_2$, and $Ni_3(PO_4)_2$.

During preparation, ambient humidity is not higher than 45%; in some embodiments, the ambient humidity is not higher than 30%; and further in some embodiments, the ambient humidity is not higher than 10%.

The lithium source is selected from one or more of $Li_2O$, $Li_2CO_3$, $Li_2C_2O_4$, $CH_3COOLi$, LiOH $H_2O$, and LiOH; the nickel source is selected from one or more of $Ni_2CO_3$, $Ni(OH)_2$, NiO, $NiSO_4$, $Ni(CH_3COO)_2$, and $NiC_2O_4$; the copper source is selected from one or more of $Cu_2(OH)_2CO_3$, $Cu(OH)_2$, CuO, $CuSO_4$, $CuC_2O_4$, and $Cu(CH_3COO)_2$; and the M source is selected from one or more of ZnO, SnO, MgO, FeO, MnO, $ZnF_2$, $SnF_2$, $MgF_2$, $FeF_2$, and $MnF_2$.

According to a third aspect, some embodiments of this application further provide a lithium secondary battery, where the lithium secondary battery includes a lithium supplement, and the lithium supplement is the foregoing lithium supplement.

In some embodiments, a positive electrode of the lithium secondary battery contains a lithium supplement, and based on a total mass of a positive electrode active substance, a mass percentage of the lithium supplement is 0.1 wt %-10 wt %, and further in some embodiments, the mass percentage of the lithium supplement is 2 wt %-8 wt %.

The positive electrode active substance includes at least one of the compounds expressed by formula (I) to formula (III):

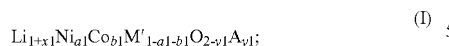 (I)

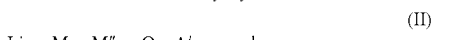 and (II)

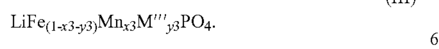 (III)

In the formula (I), $-0.1 \le x1 \le 0.2$, $0<a1<1$, $0 \le b1 \le 1$, $0<a1+b1<1$, and $0 \le y1<0.2$, M' is one or more of Mn, Fe, Cr, Ti, Zn, V, Al, Zr, and Ce, and A includes one or more of S, N, F, Cl, Br, and I; and in some embodiments, $0.5 \le a1<1$, $0<b1<0.5$, $0.7 \le a1+b1<1$, and $0 \le y<0.1$, M is either one or both of Mn and Al, and A is either one or both of S or F.

In the formula (II), $-0.1 \le x2 \le 0.2$, $0<a2 \le 2$, and $0 \le d<1$, M" includes one or more of Ni, Fe, Cr, Ti, Zn, V, Al, Mg, Zr, and Ce, and A' includes one or more of S, N, F, Cl, Br, and I.

In the formula (III), $0 \le x3 \le 1$ and $0 \le y3 \le 0.1$, and M''' is selected from one or more of transition metal elements other than Fe and Mn and non-transition metal elements.

In some embodiments, the positive electrode active substance includes at least the compound expressed by the formula (III).

In some embodiments, when the positive electrode active substance contains the compound expressed by the formula (I), pH of the compound expressed by the formula (I) is denoted as $pH_c$, pH of the lithium supplement is denoted as $pH_L$, and $pH_c \le pH_L$ holds.

In some embodiments, $pH_L \le 1.5 \times pH_c$; and in some embodiments, $pH_L \le 1.1 \times pH_c$.

According to a fourth aspect, some embodiments of this application further provide a battery module, including the foregoing lithium secondary battery.

According to a fifth aspect, some embodiments of this application further provide a battery pack, including the foregoing lithium secondary battery in this application or the foregoing battery module in this application.

According to a sixth aspect, some embodiments of this application further provide an apparatus, including the foregoing lithium secondary battery, or the foregoing battery module, or the foregoing battery pack, where the lithium secondary battery, the battery module, or the battery pack may serve as a power source of the apparatus or as an energy storage unit of the apparatus.

When the lithium supplement of this application is used in lithium secondary batteries, the processing technology is simple and requirements for process environmental conditions are low. In addition, the lithium supplement can maintain its own stability and low metal dissolution during long-term use of lithium secondary batteries, effectively improving energy density of lithium secondary batteries and ensuring a low self-discharge rate of lithium secondary batteries, thereby ensuring that the lithium secondary battery has high energy density, long cycle life, and high safety.

The battery module, the battery pack, and the apparatus that include the lithium supplement of this application have the same advantages as the lithium secondary battery including the lithium supplement.

Figure 1:
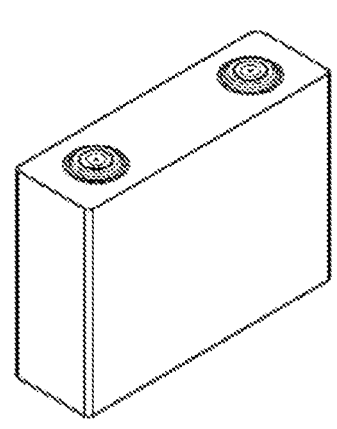
FIG. 1 is a three-dimensional diagram of a lithium secondary battery according to an embodiment of this application.

Reference signs are: 1. battery pack; 2. upper box body; 3. lower box body; 4. battery module; 5. battery cell; 51. housing; 52. electrode assembly; and 53. top cover assembly.

DESCRIPTION OF EMBODIMENTS

To make the objectives, technical solutions, and advantages of this application clearer, the following describes the embodiments of this application in detail with reference to the accompanying drawings. However, those of ordinary skill in the art should understand that these embodiments are only used to illustrate but not limit the technical solutions of this application.

The following describes in detail a lithium supplement for lithium secondary batteries, a preparation method thereof, and a lithium secondary battery, battery module, battery pack, and apparatus including such lithium supplement according to this application.

In order to improve energy density of lithium secondary batteries, "pre-lithiation" is generally performed on a negative electrode, a positive electrode, or a separator to supplement lithium ions consumed in forming an SEI film during an initial charging of lithium secondary batteries in advance. It is known that providing lithium metal powder or a lithium strip on a negative electrode of the lithium secondary battery is a relatively common method for supplementing lithium, with advantages of high specific capacity and low consumption of lithium metal. However, this method requires special devices and preparation processes, which is not conducive to large-scale commercial application due to its high costs, complicated preparation processes, harsh production environment, and poor practicability. Most importantly, the lithium metal powder or lithium strip as an active metal reacts violently with moisture in the air, posing a huge safety hazard for practical production.

In lithium secondary batteries, use of lithium-rich metal oxides as lithium supplements is also a way to improve energy density of batteries. However, when the lithium-rich metal oxides are used, secondary batteries are unstable in extractable capacity during long-term cycling, leading to limited improvement on cycle life and energy density of lithium secondary batteries, which greatly limits application of the lithium-rich metal oxides. In addition, during charging and discharging process of lithium secondary batteries containing lithium-rich metal oxides, secondary batteries are prone to self-discharge or internal short-circuit. Therefore, how to improve energy density of secondary batteries while ensuring that the battery has good electrochemical performance and high safety is a technical problem that needs to be resolved urgently for lithium secondary batteries.

Lithium Supplement

In the lithium supplement for lithium secondary batteries according to the first aspect of this application, the lithium supplement includes a compound L having a molecular formula of $Li_xNi_aCu_{1-a-b}M_bO_2$, where $1 \le x \le 2$, $0<a<1$, and $0 \le b<0.1$, and M is selected from one or more of Zn, Sn, Mg, Fe, and Mn.

An XRD pattern of the lithium supplement shows a first diffraction peak at a diffraction angle 2θ of 42°-44° and a second diffraction peak at a diffraction angle 2θ of 25°-27°. A diffraction intensity of the first diffraction peak is $I_1$, a diffraction intensity of the second diffraction peak is $I_2$, and $I_1/I_2<0.1\%$ holds.

The first diffraction peak corresponds to a diffraction peak of nickel oxide on a (200) crystal plane, and the second diffraction peak corresponds to a diffraction peak of the compound L on a (100) crystal plane.

It is well known in the art that, generally, for perfectly crystallized nickel oxide, the strongest diffraction peak is a diffraction peak corresponding to the (200) crystal plane, and the diffraction peak is located at a diffraction angle 2θ of 43.2°. For perfectly crystallized $LiNi_{0.5}Cu_{0.5}O_2$, the strongest diffraction peak is a diffraction peak corresponding to the (100) crystal plane, and the diffraction peak is located at the diffraction angle 2θ of 26.0°. For the compound L ($Li_xNi_aCu_{1-a-b}M_bO_2$) of this application, a doping element M has a small amount in the compound L ($0 \le b<0.1$), which has little effect on a crystal structure of the compound L. Therefore, a peak position of an XRD diffraction pattern of the compound L is almost identical to that of pure $LiNi_{0.5}Cu_{0.5}O_2$. It should be pointed out that a certain error in a material grain size and test instrumentation can cause a small shift of the peak position in the XRD pattern, usually within ±1°.

In this application, a method for testing the XRD pattern of the lithium supplement can be determined by using an instrument and a method known in the art. As an example, the following method can be used for testing: With Cu as a target material, an X-ray diffractometer of model Bruker D8 Discover is used to perform an XRD test on a test sample of a lithium supplement at a diffraction angle 2θ of 15°-75° under a voltage of 40 kV. The test sample of the lithium supplement can be prepared according to the following methods: 0.5 g-1 g of the lithium supplement is taken for grinding, compacted on a surface of a slide to obtain the test sample of the lithium supplement, and then the foregoing test is performed.

In this application, the lithium supplement includes the compound L having a molecular formula of $Li_xNi_aCu_{1-a-b}M_bO_2$, and when a ratio of peak intensities of the first diffraction peak at a diffraction angle 2θ of 42°-44° to the second diffraction peak at a diffraction angle 2θ of 25°-27° in the XRD pattern of the lithium supplement is $I_1/I_2<0.1\%$, the lithium supplement can exert a high gram capacity and has good electrochemical stability. When the foregoing lithium supplement is applied to a lithium secondary battery, energy density of the lithium secondary battery can be effectively improved, and during long-term charging and discharging of the lithium secondary battery, self-discharge of the battery can be effectively reduced.

In an embodiment of this application, $I_1/I_2<0.05\%$. In some embodiments, $I_1/I_2<0.01\%$. Further in some embodiments, $I_1/I_2<0.005\%$. Specifically, a value of $I_1/I_2$ may be 0.1%, 0.09%, 0.08%, 0.07%, 0.06%, 0.05%, 0.04%, 0.03%, 0.02%, 0.01%, 0.009%, 0.008%, 0.007%, 0.006%, 0.005%, or a value within a range obtained by combining any two of the foregoing values.

In an embodiment of this application, based on total weight of the lithium supplement, a percentage of free lithium contained in the lithium supplement is ≤5 wt %. In some embodiments, the percentage of free lithium contained in the lithium supplement is ≤1 wt %. The free lithium (also referred to "residual lithium") mentioned herein refers to lithium-containing oxides, hydroxides, and/or carbonates on the surface of the compound L. In this application, when free lithium is present in the lithium supplement, the presence of these small amounts of free lithium may neutralize hydrofluoric acid generated by decomposition of an electrolyte, weakening corrosive effect on a positive electrode active substance or the lithium supplement in the battery. But when a relative percentage of free lithium is too high, the free lithium has side reactions with the electrolyte, which reduces cycle life of the secondary battery and increases a self-discharge rate of the secondary battery during storage. In an embodiment of this application, for example, including but not limited to, a percentage of free lithium contained in the lithium supplement does not exceed 5 wt %, 3 wt %, 1 wt %, 0.8 wt %, 0.5 wt %, or 0.3 wt % of total weight of the lithium supplement, or a value within a range obtained by combining any two of the foregoing values.

In this application, a method for testing the percentage of free lithium contained in the lithium supplement is well known in the art. In an example, the following method can be used for testing: 30 g of the lithium supplement is taken and added to 100 mL of deionized water and stirred at a speed of 200 rpm for 30 minutes, free lithium in the test sample is titrated with a standard solution of hydrochloric acid, and a titration end-point is determined by a sudden potential jump using a compound pH electrode as an indicator electrode.

In an embodiment of this application, the free lithium includes $Li_2CO_3$ and LiOH.

In an embodiment of this application, pH of the lithium supplement is denoted as $pH_L$, and $11 \leq pH_L \leq 13$ holds. In some embodiments, $11.5 \leq pH_L \leq 12.5$. In this application, when a pH value of the lithium supplement is controlled within the above range, a proportion of active lithium in the lithium supplement can be effectively increased, and chemical coagulation of a positive electrode slurry during processing can be effectively avoided, which is beneficial to manufacturing. In a specific embodiment of this application, $pH_L$ of the lithium supplement may be, for example, 11, 11.5, 12, or 12.5, or all ranges and sub-ranges formed by these values. For example, the ranges and sub-ranges include but are not limited to 11-12.5, 11.5-12, or the like.

In this application, a method for testing $pH_L$ of the lithium supplement is well known in the art. In an example, the following method can be used for testing: A Mettler pH meter model S220 is used, and 5 g of the lithium supplement is added to 45 g of $CO_2$-free water (mass ratio of powder to solvent=1:9), stirred at a speed of 200 rpm for 30 minutes, and left standing for 1.5 h. The solution containing the lithium supplement can be tested with the pH meter calibrated.

In an embodiment of this application, a water concentration of the lithium supplement is ≤800 ppm. In another embodiment of this application, the water concentration of the lithium supplement is ≤300 ppm. Moisture in the lithium supplement reacts with the electrolyte to generate HF, which leads to metal dissolution and increases self-discharge of the lithium secondary battery during use, resulting in an increased self-discharge rate of the lithium secondary battery. In a specific embodiment of this application, the water concentration of the lithium supplement may be, for example, 800 ppm, 500 ppm, 300 ppm, 200 ppm, or 100 ppm, or all ranges and sub-ranges formed by these values. For example, the ranges and sub-ranges include but are not limited to 100 ppm-800 ppm, 100 ppm-500 ppm, 100 ppm-300 ppm, 100 ppm-200 ppm, and the like.

In this application, a method for testing the water concentration of the lithium supplement is well known in the art. In an example, the following method can be used for testing: A Coulomb moisture meter with model 831 is used, 10 g of the lithium supplement is taken and heated at 170° C. in an 874-model automatic Karl Fischer sample heater, and purged with dry gas at a 40 mL/min flow rate into a titration vessel to titrate the water concentration for a titration time of 400 s.

In an embodiment of this application, a median particle size by volume $D_v50$ of the lithium supplement is 2 μm-10 μm. In another embodiment of this application, the median particle size by volume $D_v50$ of the lithium supplement is 3 μm-6 μm. A smaller particle size of the lithium supplement indicates a higher specific surface area, greater activity, and a larger area in contact with the electrolyte, so that the lithium secondary battery has a higher extractable capacity during cycling. However, an excessively small particle size makes the powder easily agglomerate, affecting capacity per gram performance. In an embodiment of this application, the median particle size by volume $D_v50$ of the lithium supplement may be, for example, 1 μm, 2 μm, 3 μm, 5 μm, 6 μm, 8 μm, or 10 μm, or all ranges and sub-ranges formed by these values. For example, the ranges and sub-ranges include but are not limited to 1-10, 2-10, 1-8, 2-8, 1-6, 2-6, 1-5, 2-5, 5-8, 5-10, or the like.

In this application, a method for testing the median particle size by volume $D_v50$ of the lithium supplement is well known in the art. As an example, the following method can be used for testing: With reference to the GB/T 19077-2016 particle size distribution laser diffraction method, a laser particle size analyzer (for example, Malvern Mastersizer 2000E, UK) is used for measurement. $D_v50$ described herein indicates a corresponding particle size when a cumulative volume distribution percentage of the material reaches 50%.

In an embodiment of this application, in the molecular formula of the compound L, $0<a<1$. In another embodiment of this application, in the molecular formula of the compound L, $0.1 \leq a \leq 0.9$. In some embodiments, $0.2 \leq a \leq 0.6$, and further in some embodiments, $0.2 \leq a \leq 0.4$. In another embodiment of this application, for the compound L, a is 0.1, 0.2, 0.3, 0.4, 0.5, or 0.6.

In an embodiment of this application, in the molecular formula of the compound L, $0 \leq b<0.1$. In another embodiment of this application, in the molecular formula of the compound L, $0 \leq b \leq 0.05$. In another embodiment of this application, for the compound L, b=0 or 0.05. In another embodiment of this application, for the compound L, b=0.05.

In this application, when relative molar ratios a and (1-a-b) of element Ni to element Cu in the compound L are within the above ranges, it is beneficial to synthesize a compound L with higher crystallinity at a lower temperature, effectively reducing production cost, and it can also be ensured that the lithium supplement containing the compound L has a high gram capacity and charge-discharge plateau, helping improve the energy density of the lithium secondary battery.

In an embodiment of this application, for the compound L, M is selected from one or more of Zn, Sn, Mg, Fe, and Mn. In another embodiment of this application, for the compound L, M is selected from Mg. When the compound L is doped with the element M, a sintering temperature of the compound L can be lowered and crystallinity of the compound L can be improved.

In an embodiment of this application, the molecular formula of the compound L is $Li_xNi_aCu_{1-a}O_2$, where x and a are as described above.

In an embodiment of this application, the compound L includes but is not limited to $Li_2Ni_{0.1}Cu_{0.9}O_2$, $Li_2Ni_{0.2}Cu_{0.8}O_2$, $Li_2Ni_{0.3}Cu_{0.7}O_2$, $Li_2Ni_{0.4}Cu_{0.6}O_2$, $Li_2Ni_{0.5}Cu_{0.5}O_2$, $Li_2Ni_{0.6}Cu_{0.4}O_2$, $Li_2Ni_{0.7}Cu_{0.3}O_2$, $Li_2Ni_{0.8}Cu_{0.2}O_2$, $Li_2Ni_{0.9}Cu_{0.1}O_2$, or $Li_2Ni_{0.4}Cu_{0.55}Mg_{0.05}O_2$.

In an embodiment of this application, the lithium supplement further includes a coating material on at least partial surface of the compound L, and the coating material is selected from one or more of metal fluorides, oxides, and phosphates. In some embodiments, the metal fluoride is selected from $AlF_3$; the oxide is selected from one or more of $V_2O_5$, $Al_2O_3$, $ZrO_2$, $TiO_2$, ZnO, $SiO_2$, and $B_2O_3$; and the phosphate is selected from one or more of $AlPO_4$, $FePO_4$, $Co_3(PO_4)_2$, and $Ni_3(PO_4)_2$.

In this application, when the compound L is further coated with the foregoing material, the water concentration and pH percentage on the surface of the lithium supplement can be further reduced, thereby improving ease of processing and electrochemical stability of the lithium supplement.

Preparation of Lithium Supplement

The preparation method of the lithium supplement for lithium secondary batteries according to the second aspect of this application includes the following steps:

S1: weighing a lithium source, a nickel source, a copper source, and an M source, and mixing them and then performing ball milling, where a molar ratio of Li, Ni, Cu, and M is c:a:(1-a-b):b, 2≤c≤3, 0<a<1, and 0≤b<0.1, and M is selected from one or more of Zn, Sn, Mg, Fe, and Mn; and S2: sintering the ball-milled mixture to obtain a lithium supplement.

In S1, 2.1≤c≤2.7 and 0.1≤a≤0.9; in some embodiments, 2.2≤c≤2.6 and 0.2≤a≤0.6; and further in some embodiments, 0.2≤a≤0.4.

In S2, the sintering satisfies at least one of the following conditions:

(1) A temperature rise rate is 1° C./min-10° C./min; and in some embodiments, the temperature rise rate is 3° C./min-5° C./min;

(2) A sintering temperature is 600° C.-800° C.; and in some embodiments, the sintering temperature is 650° C.-750° C.; and (3) A temperature hold time is 5 h-20 h; and in some embodiments, the temperature hold time is 6 h-10 h.

In some embodiments, the method further includes S3: crushing and grading the sintered product obtained in S2 to obtain a graded product with a median particle size $D_v50$ of 2 μm-10 μm. In some embodiments, the median particle size by volume $D_v50$ of the graded product is 3 μm-6 μm.

In some embodiments, the method further includes S4: washing the graded product of S3 with absolute ethanol or isopropanol for a wash time of 0 h-2 h. In some embodiments, the wash time is 0.2 h-1.5 h.

In some embodiments, the method further includes S5: drying or infrared heating the washed product under vacuum or an inert atmosphere. In some embodiments, the inert atmosphere includes nitrogen or argon, a temperature for the drying or infrared heating is 100° C.-200° C., and a time for drying or infrared heating is 2 h-12 h.

In some embodiments, the method further includes S6: performing ball milling and coating on a target lithium supplement with a coating material, where the coating material is selected from one or more of metal fluorides, oxides, and phosphates.

In a specific embodiment of this application, the metal fluoride is selected from $AlF_3$.

In a specific embodiment of this application, the oxide is selected from one or more of $V_2O_5$, $Al_2O_3$, $ZrO_2$, $TiO_2$, ZnO, $SiO_2$, and $B_2O_3$.

In a specific embodiment of this application, the phosphate is selected from one or more of $AlPO_4$, $FePO_4$, $Co_3(PO_4)_2$, and $Ni_3(PO_4)_2$.

In a specific embodiment of this application, the lithium source is selected from one or more of $Li_2O$, $Li_2CO_3$, $Li_2C_2O_4$, $CH_3COOLi$, LiOH $H_2O$, and LiOH.

In a specific embodiment of this application, the nickel source is selected from one or more of $Ni_2CO_3$, $Ni(OH)_2$, NiO, $NiSO_4$, $Ni(CH_3COO)_2$, and $NiC_2O_4$.

In a specific embodiment of this application, the copper source is selected from one or more of $Cu_2(OH)_2CO_3$, $Cu(OH)_2$, CuO, $CuSO_4$, $CuC_2O_4$, and $Cu(CH_3COO)_2$.

In a specific embodiment of this application, the M source is selected from one or more of ZnO, SnO, MgO, FeO, MnO, $ZnF_2$, $SnF_2$, $MgF_2$, $FeF_2$, and $MnF_2$.

In some embodiments, during preparation, ambient humidity is not higher than 45%. In some embodiments, the ambient humidity is not higher than 30%. Further in some embodiments, the ambient humidity is not higher than 10%.

Lithium Secondary Battery

The lithium secondary battery according to the third aspect of this application includes the foregoing lithium supplement. In some embodiments, a positive electrode of the lithium secondary battery contains a lithium supplement, and based on a total mass of a positive electrode active substance, a mass percentage of the lithium supplement is 0.1 wt %-10 wt %; and further in some embodiments, a mass percentage of the lithium supplement is 2 wt %-8 wt %.

Figure 2:
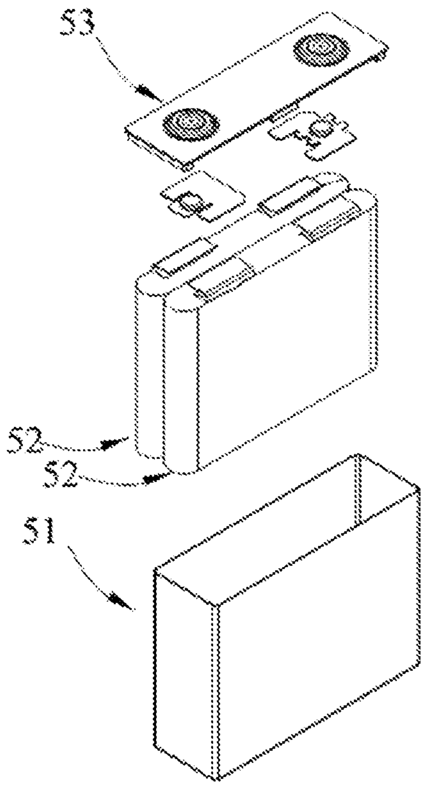
FIG. 2 is an exploded view of the lithium secondary battery in FIG. 1.

FIG. 1 is a three-dimensional diagram of a lithium secondary battery according to an embodiment of this application. FIG. 2 is an exploded view of the lithium secondary battery in FIG. 1. Referring to FIG. 1 and FIG. 2, the lithium secondary battery 5 (hereinafter referred to as a battery cell 5) according to this application includes a housing 51, an electrode assembly 52, and a top cover assembly 53. The electrode assembly 52 is accommodated in the housing 51. A quantity of the electrode assemblies 52 is not limited, and may be one or more.

It should be noted that the battery cell 5 in FIG. 1 is a tank type battery, but is not limited thereto in this application. The battery cell 5 may be a bag type battery, which means that the housing 51 is replaced with a metal plastic film and the top cover assembly 53 is eliminated.

In an embodiment of this application, the positive electrode includes a positive electrode active substance that can release and accept lithium ions and the foregoing lithium supplement. The positive electrode active substance includes at least one of the compounds expressed by formula (I) to formula (III):

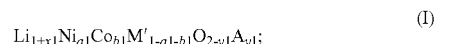

$$Li_{1+x1}Ni_{a1}Co_{b1}M'_{1-a1-b1}O_{2-y1}A_{y1}; \quad (I)$$

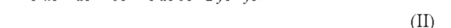

$$Li_{1+x2}Mn_{a2}M''_{2-a2}O_{4-d}A'_{d}; \text{ and} \quad (II)$$

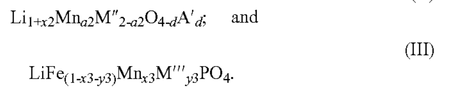

$$LiFe_{(1-x3-y3)}Mn_{x3}M'''_{y3}PO_4. \quad (III)$$

In the formula (I), −0.1≤x1≤0.2, 0<a1<1, 0≤b1≤1, 0<a1+b1<1, and 0≤y1<0.2, M' is one or more of Mn, Fe, Cr, Ti, Zn, V, Al, Zr, and Ce, and A includes one or more of S, N, F, Cl, Br, and I; and in some embodiments, 0.5≤a1<, 0<b1<0.5, 0.7≤a1+b1<1, and 0≤y<0.1, M is either one or both of Mn and Al, and A is either one or both of S or F.

In the formula (II), −0.1≤x2≤0.2, 0<a2≤2, and 0≤d<1, M'' includes one or more of Ni, Fe, Cr, Ti, Zn, V, Al, Mg, Zr, and Ce, and A' includes one or more of S, N, F, Cl, Br, and I.

In the formula (III), 0≤x3≤1 and 0≤y3≤0.1, and M''' is selected from one or more of transition metal elements other than Fe and Mn and non-transition metal elements.

In some embodiments, the positive electrode active substance includes at least the compound expressed by the formula (III).

In an embodiment of this application, the positive electrode active substance is selected from one or more of $LiFePO_4$, $Li_3V_2(PO_4)_3$, $LiFe_yMn_{1-y}PO_4$, $LiNi_{0.8}Co_{0.15}Al_{0.05}O_2$, $LiNi_{0.8}Co_{0.1}Mn_{0.1}O_2$, $LiNi_{0.5}Co_{0.2}Mn_{0.3}O_2$, $LiMnO_2$, $LiMn_2O_4$, $LiCoO_2$, $LiMnPO_4$, and $LiNiO_2$, where 0<y<1. In a specific embodiment of this application, the positive electrode active substance is $LiFePO_4$. In another specific embodiment of this application, the positive electrode active substance is $LiNi_{0.8}Co_{0.1}Mn_{0.1}O_2$ (namely, NCM 811).

In an embodiment of this application, when the positive electrode active substance contains the compound expressed by the formula (I), pH of the compound expressed by the formula (I) is denoted as $pH_c$, pH of the lithium supplement is denoted as $pH_L$, and $pH_c \le pH_L$ holds. In some embodiments, $pH_L \le 1.5 \times pH_c$. Further in some embodiments, $pH_L \le 1.1 \times pH_c$. When pHs of a ternary positive electrode active substance and the lithium supplement satisfy the foregoing relationship, the lithium supplement and the ternary positive electrode active substance can coexist stably in a positive electrode slurry, improving ease of processing of the lithium supplement in the lithium secondary battery and uniform distribution of compositions on a positive electrode plate, which helps mass production and enables the battery have both high energy density and low self-discharge rate.

In this application, a method for testing $pH_c$ of the ternary positive electrode active substance is well known in the art. In an example, $pH_c$ can be determined by using the same method as that for testing $pH_L$ of the lithium supplement.

In this specification, a conductive agent used for the positive electrode is not specifically limited and may be approximately selected according to actual needs, for example, a conductive agent in the art commonly used for the positive electrode, provided that the technical solution of this application can be implemented. In an embodiment of this application, the conductive agent is carbon black.

In this specification, a binder used for the positive electrode is not specifically limited and may be appropriately selected according to actual needs, for example, a binder in the art commonly used for the positive electrode, provided that the technical solution of this application can be implemented. In an embodiment of this application, the binder is one or more of polyvinylidene fluoride (PVDF), styrene-butadiene rubber (SBR), and sodium carboxymethyl cellulose (CMC-Na).

In this specification, a negative electrode used in the lithium secondary battery is not specifically limited, may be appropriately selected according to actual needs, and can be those negative electrodes commonly used in lithium secondary batteries, provided that the technical solution of this application can be implemented. In an example, in an embodiment of this application, the negative electrode includes a negative electrode active substance that can accept and release lithium ions. The negative electrode active substance is selected from soft carbon, hard carbon, artificial graphite, natural graphite, silicon, a silicon-oxygen compound, a silicon carbon composite, lithium titanate, a metal that can form an alloy with lithium, and the like. In some embodiments, the negative electrode active substance may select a negative electrode active substance with a high gram capacity, such as silicon, silicon-oxygen compound, and silicon carbon composite with a high gram capacity.

The substance of a separator used in the lithium secondary battery is not limited herein and can be selected according to actual needs. In an embodiment of this application, the separator is a polyethylene film (PE). In another embodiment of this application, the separator is a polyethylene film (PE) with a thickness of 12 μm.

In a specific application, the positive electrode generally needs to be further processed into a positive electrode plate for use. A structure and preparation method of the positive electrode plate are known in the art. For example, the positive electrode active substance, conductive agent, binder, and lithium supplement are uniformly mixed in an organic solvent, and then applied onto a positive electrode current collector (for example, an Al foil), followed by drying and cold pressing to obtain a positive electrode plate.

Similarly, in a specific application, the negative electrode generally needs to be further processed into a negative electrode plate for use. A structure and preparation method of the negative electrode plate are known in the art. For example, the negative electrode active substance, the conductive agent, the binder, and a thickener are uniformly mixed in a solvent, and then applied onto a negative electrode current collector (for example, a Cu foil), followed by drying and cold pressing to obtain a negative electrode plate.

The negative electrode active substance, conductive agent, binder, thickener, and solvent that are used for the negative electrode are all conventional reagents used for the lithium secondary battery, and details are not described herein.

In this specification, an electrolyte used in the lithium secondary battery is not specifically limited and may be appropriately selected according to actual needs, for example, an electrolyte in the art commonly used in the lithium secondary battery, provided that the technical solution of this application can be implemented. In an embodiment of this application, the electrolyte can be one of ethylene carbonate (EC) and ethyl methyl carbonate (EMC) or any combination thereof, for example, the two may be mixed in any ratio in a mass ratio of 1:9, 2:8, 3:7, or 4:6.

Battery Module

The battery module according to the fourth aspect of this application includes the foregoing lithium secondary battery of this application.

Figure 3:
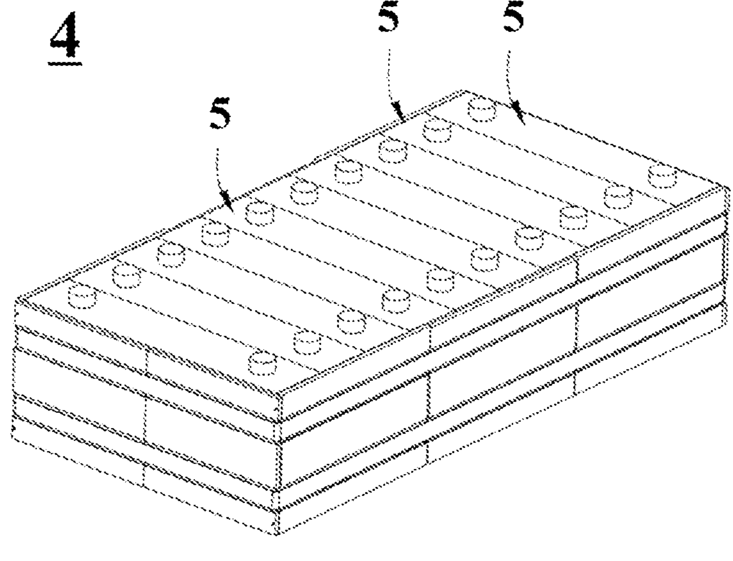
FIG. 3 is a three-dimensional diagram of a battery module according to an embodiment of this application.

FIG. 3 is a three-dimensional diagram of a battery module according to an embodiment of this application. Referring to FIG. 3, the battery module of this application may be a battery module 4, which includes a plurality of battery cells 5 arranged in a longitudinal direction.

The battery module 4 may be used as a power source or an energy storage apparatus. A quantity of battery cells 5 included in the battery module 4 may be adjusted based on use and capacity of the battery module 4.

Battery Pack

The battery pack according to the fifth aspect of this application includes the foregoing lithium secondary battery of this application or the foregoing battery module of this application.

Figure 4:
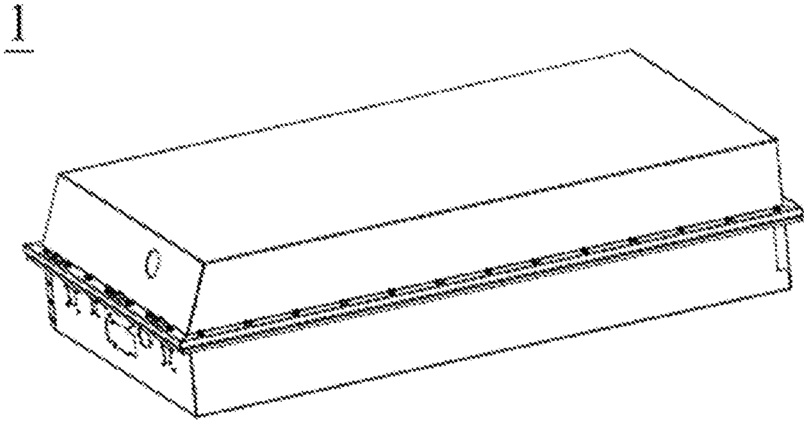
FIG. 4 is a three-dimensional diagram of a battery pack according to another embodiment of this application.
Figure 5:
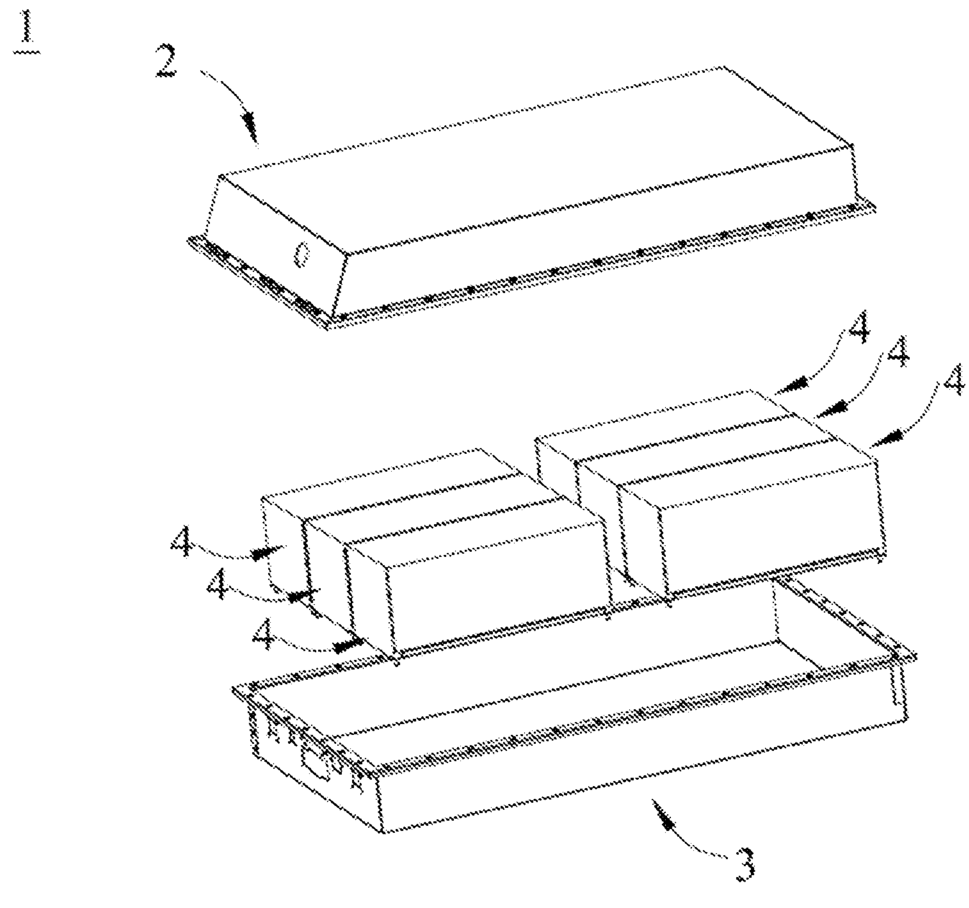
FIG. 5 is an exploded view of the battery pack in FIG. 4.

FIG. 4 is a three-dimensional diagram of a battery pack according to another embodiment of this application. FIG. 5 is an exploded view of the battery pack in FIG. 4. Referring to FIG. 4 and FIG. 5, the battery pack 1 of this application includes an upper box body 2, a lower box body 3, and the battery module 4. The upper box body 2 and the lower box body 3 are assembled to form a space for accommodating the battery module 4. The battery module 4 is disposed in the space in which the upper box body 2 and the lower box body 3 are assembled.

An output electrode of the battery module 4 penetrates through one or both of the upper box body 2 and the lower box body 3 to output power or to charge from an outer source.

It should be noted that a quantity and an arrangement of the battery modules 4 used in the battery pack 1 may be determined according to an actual need. The battery pack 1 may be used as a power source or an energy storage apparatus.

Apparatus

The apparatus according to the sixth aspect of this application includes the foregoing lithium secondary battery of this application, or the foregoing battery module of this application, or the foregoing battery pack of this application. The lithium secondary battery, the battery module, or the battery pack may be used as a power source of the apparatus of this application or an energy storage unit of the apparatus.

Figure 6:
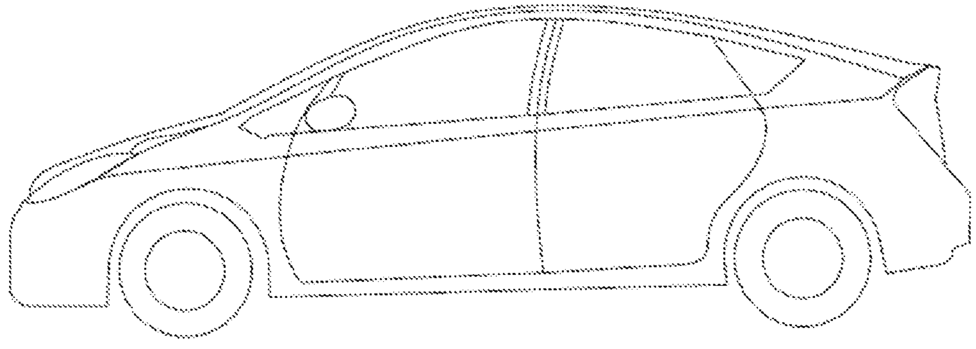
FIG. 6 is a schematic diagram of an apparatus using a lithium secondary battery as a power source according to an embodiment of this application.

FIG. 6 is a schematic diagram of an apparatus using a lithium secondary battery as a power source according to an embodiment of this application. As an example only, in FIG. 6, the apparatus that uses the battery cell 5 is an electric automobile. However, the apparatus that uses the battery cell 5 is obviously not limited to this, but may be any electric vehicle other than electric automobiles (for example, an electric bus, an electric tram, an electric bicycle, an electric motorbike, an electric scooter, an electric golf cart, or an electric truck), an electric vessel, an electric tool, a consumer electronic product, and an energy storage system.

The electric vehicle may be a battery electric vehicle, a hybrid electric vehicle, or a plug-in hybrid electric vehicle. Certainly, depending on an actual use form, the apparatus provided in the sixth aspect of this application may include the battery module according to the fourth aspect of this application or the battery pack according to the fifth aspect of this application.

EXAMPLES

The technical solutions of this application will be further explained below with reference to specific examples. Obviously, the following example embodiments are only used for illustration but no limitations on the technical solutions of this application. All other examples obtained by a person skill in the art based on the examples of this application without creative efforts shall fall within the protection scope of this application.

Example 1

1. Preparation of Lithium Supplement According to Following Steps

S1: $Li_2O$, NiO, and CuO powders were weighted with a molar ratio of Li, Ni, and Cu being 2.05:0.4:0.6, and their mixture was ball-milled and mixed well;

S2: A temperature of the mixture was risen to 680° C. at a temperature rise rate of 3° C./min under a nitrogen atmosphere, and the temperature was maintained for 10 h and then naturally reduced;

S3: A resulting product was crushed and graded to obtain a graded product with $D_v50$ of about 5 μm; and S4: The graded product was then washed with absolute ethanol for 0.5 h and finally baked in a blast oven at 160° C. for 12 h to obtain a lithium supplement with compositions and parameters shown in Table 1 below.

2. Preparation of Positive Electrode Plate

A carbon-coated positive electrode active material $LiFePO_4$ (LFP), the prepared lithium supplement, a conductive agent carbon black (Super P), and a binder polyvinylidene fluoride (PVDF) were mixed well in a mass ratio of 94:2:3:1 in a proper amount of solvent N-methylpyrrolidone (NMP) to obtain a positive electrode slurry, where the pH value of the carbon-coated positive electrode active material $LiFePO_4$ (LFP) was 8.9. The positive electrode slurry was applied on a positive electrode current collector aluminum foil, followed by processes such as drying, cold pressing, slitting, and cutting, to obtain a positive electrode plate.

3. Preparation of Negative Electrode Plate

A negative electrode active material graphite, a conductive agent carbon black (Super P), a binder butadiene styrene rubber (SBR), and sodium carboxymethyl cellulose (CMC-Na) were mixed well in a mass ratio of 96:1.5:1.5:1.0 in a proper amount of solvent deionized water to obtain a negative electrode slurry. The negative electrode slurry was applied on a negative electrode current collector copper foil, followed by processes such as drying, cold pressing, slitting, and cutting, to obtain a negative electrode plate.

4. Separator

The separator was a polyethylene (PE) film.

5. Preparation of Electrolyte

Ethylene carbonate (EC) and methyl ethyl carbonate (EMC) were mixed in a mass ratio of 30:70 to obtain an organic solvent; a fully dried electrolytic salt $LiPF_6$ was dissolved in the above mixed solvent, with a concentration of 1.3 mol/L. Then, 6% fluoroethylene carbonate (FEC) as an additive was added into the mixed solvent and uniformly mixed with the solvent to obtain an electrolyte. A concentration of the electrolytic salt was calculated based on the total volume of the electrolyte, and the additive content is a weight percentage calculated based on the total weight of the electrolyte.

6. Preparation of Lithium Secondary Battery

The prepared positive electrode plate, the separator, and the negative electrode plate were sequentially stacked, so that the separator was located between the positive electrode plate and the negative electrode plate to provide separation. Then, the stack was wound to form an electrode assembly. The electrode assembly was placed in an outer package and the prepared electrolyte was injected into the bare cell that was dried, followed by processes such as vacuum packaging, standing, formation, and shaping, to obtain a lithium secondary battery.

Example 2

The lithium secondary battery of this application was prepared according to the method in Example 1 except that the synthesis temperature in step S2 of preparing the lithium supplement of this example was 670° C. Compositions and parameters of the prepared lithium supplement are given in Table 1 below.

Example 3

The lithium secondary battery of this application was prepared according to the method in Example 1 except that the synthesis temperature in step S2 of preparing the lithium supplement of this example was 660° C. Compositions and parameters of the prepared lithium supplement are given in Table 1 below.

Example 4

The lithium secondary battery of this application was prepared according to the method in Example 1 except that the synthesis temperature in step S2 of preparing the lithium supplement of this example was 640° C. Compositions and parameters of the prepared lithium supplement are given in Table 1 below.

Example 5

The lithium secondary battery of this application was prepared according to the method in Example 1 except that in step S1 of preparing the lithium supplement in this example, magnesium oxide was added, where a molar ratio of Li, Ni, Cu, and Mg was 2.05:0.4:0.55:0.05; and the synthesis temperature in step S2 was 670° C. Compositions and parameters of the prepared lithium supplement are given in Table 1 below.

Example 6

The lithium secondary battery of this application was prepared according to the method in Example 1 except that the positive electrode active substance used in the positive electrode plate of this example was $LiNi_{0.5}Co_{0.2}Mn_{0.3}O_2$. Compositions and parameters of the prepared lithium supplement are given in Table 1 below.

Example 7

The lithium secondary battery of this application was prepared according to the method in Example 1 except that in step S1 of preparing the lithium supplement in this example, a molar ratio of Li, Ni, and Cu was 2.05:0.1:0.9. Compositions and parameters of the prepared lithium supplement are given in Table 1 below.

Example 8

The lithium secondary battery of this application was prepared according to the method in Example 1 except that in step S1 of preparing the lithium supplement in this example, a molar ratio of Li, Ni, and Cu was 2.05:0.2:0.8. Compositions and parameters of the prepared lithium supplement are given in Table 1 below.

Example 9

The lithium secondary battery of this application was prepared according to the method in Example 1 except that in step S1 of preparing the lithium supplement in this example, a molar ratio of Li, Ni, and Cu was 2.05:0.6:0.4. Compositions and parameters of the prepared lithium supplement are given in Table 1 below.

Example 10

The lithium secondary battery of this application was prepared according to the method in Example 1 except that in step S1 of preparing the lithium supplement in this example, a molar ratio of Li, Ni, and Cu was 2.05:0.9:0.1. Composition and parameters of the lithium supplement are given in Table 1 below.

Comparative Example 1

The lithium secondary battery in Comparative Example 1 (corresponding to D1 in Table 1) was prepared according to the method in Example 1 except that no lithium supplement was added to the positive electrode plate in this Comparative Example.

Comparative Example 2

The lithium secondary battery in Comparative Example 2 (corresponding to D2 in Table 1) was prepared according to the method in Example 6 except that no lithium supplement was added to the positive electrode plate in this Comparative Example.

Comparative Example 3

The lithium secondary battery in Comparative Example 3 (corresponding to D3 in Table 1) was prepared according to the method in Example 1 except that the synthesis temperature in step S2 of preparing the lithium supplement in this Comparative Example was 820° C. Compositions and parameters of the prepared lithium supplement are given in Table 1 below.

Comparative Example 4

The lithium secondary battery in Comparative Example 4 (corresponding to D4 in Table 1) was prepared according to the method in Example 6 except that the synthesis temperature in step S2 of preparing the lithium supplement in this Comparative Example was 850° C. Compositions and parameters of the prepared lithium supplement are given in Table 1 below.

Parameter characterization of positive electrode active substance and lithium supplement 1. XRD Analysis With Cu as a target material, an X-ray diffractometer of model Bruker D8 Discover was used to perform XRD analysis of a test sample of a lithium supplement at a diffraction angle 2θ of 15°-75° at a voltage of 40 kV. The test samples of the lithium supplement may be prepared by using the following method: 0.5 g of the lithium supplement prepared in each of the examples and comparative examples was taken, separately ground, and compacted on a surface of a slide, so that test samples of the lithium supplement were obtained, for subsequent XRD analysis.

Figure 7:
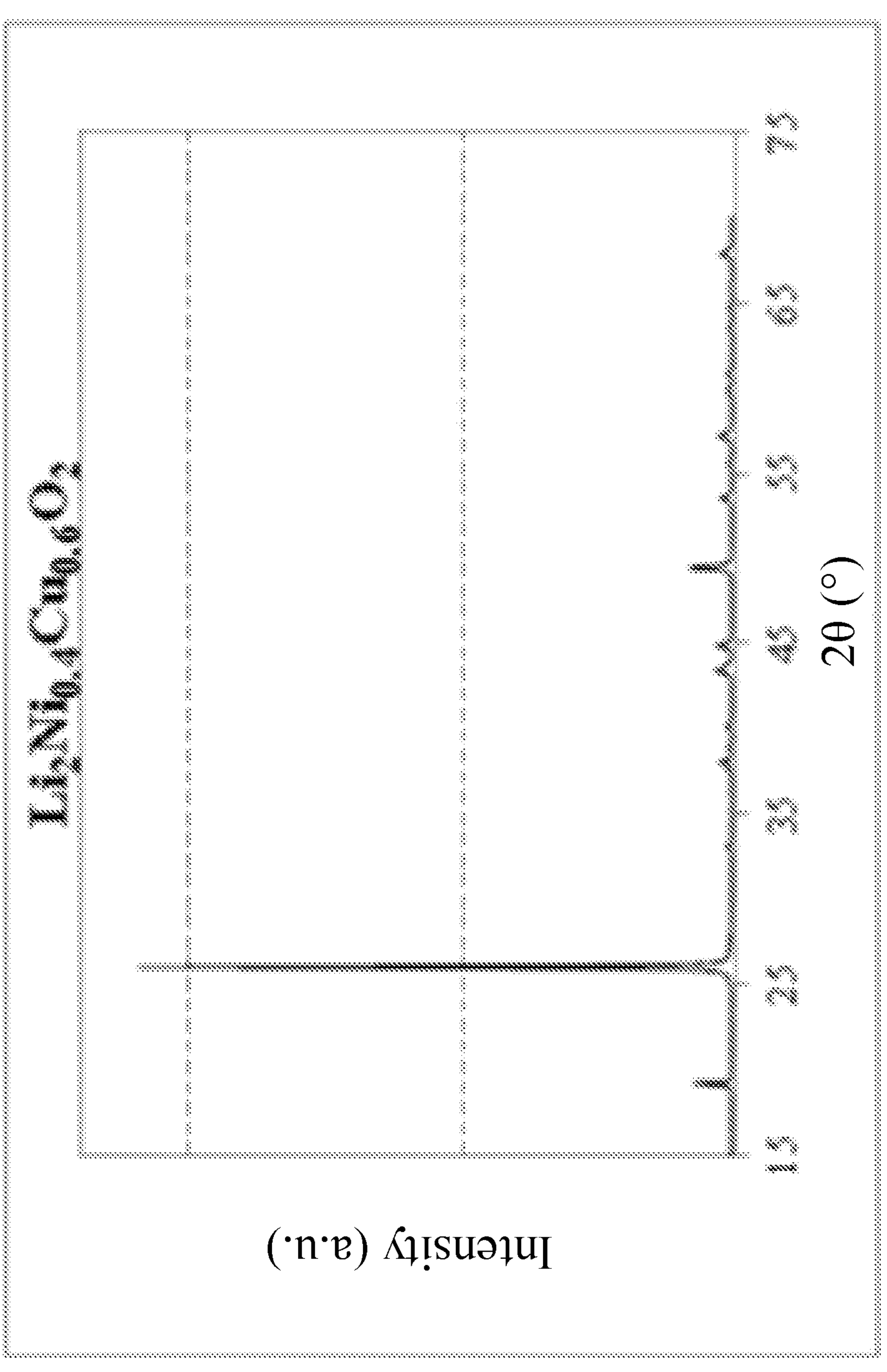
FIG. 7 is an XRD pattern of a lithium supplement according to Example 1 of this application.

FIG. 7 shows an XRD pattern of the lithium supplement according to Example 1 of this application, and XRD patterns of the lithium supplements of other examples of this application are basically the same and are not provided herein. It can be seen from FIG. 7 that the XRD pattern shows a first diffraction peak (with diffraction intensity of $I_1$) at a 2θ angle of 43.2°, which corresponds to a diffraction peak position of perfectly crystallized nickel oxide on a (200) crystal plane; that the XRD pattern shows a second diffraction peak (with diffraction intensity of $I_2$) at a 2θ angle of 26.0°, which corresponds to a diffraction peak position of the compound L on a (100) crystal plane; and that $I_1/I_2=0.01\%$.

2. Measurement of Percentage of Free Lithium Contained in Lithium Supplement 30 g of the lithium supplement prepared in each of the examples was taken and separately added into 100 mL of deionized water and stirred at a rotational speed of 200 r/min for 30 minutes. Free lithium in the test sample was titrated with a standard solution of hydrochloric acid, a titration end-point was determined by a sudden potential jump using a composite pH electrode as an indicator electrode, and then a percentage of free lithium was calculated.

3. Measurement of pH Values of the Lithium Supplement and Positive Electrode Active Substance A Mettler acidity meter with model S220 was used, and 5 g of the sample under test was taken and added to 45 g of $CO_2$-free water (mass ratio of powder to solvent=1:9), stirred at a speed of 200 rpm for 30 minutes, and then left standing for 1.5 h. A pH value of the sample solution under test was measured with the pH meter calibrated.

4. Measurement of Water Concentration of Lithium Supplement

A Coulomb moisture analyzer with model 831 was used, and 10 g of lithium supplement was taken and heated at 170° C. in an 874-model automatic Karl Fischer sample heater, and purged with dry gas at a flow rate of 40 mL/min into a titration vessel to titrate the water concentration for a titration time of 400 s.

5. Measurement of Median Particle Size by Volume $D_v50$ of Lithium Supplement

With reference to the GB/T 19077-2016 particle size distribution laser diffraction method, a laser particle size analyzer (for example, Malvern Mastersizer 2000E, UK) was used for measurement.

Figure 8:
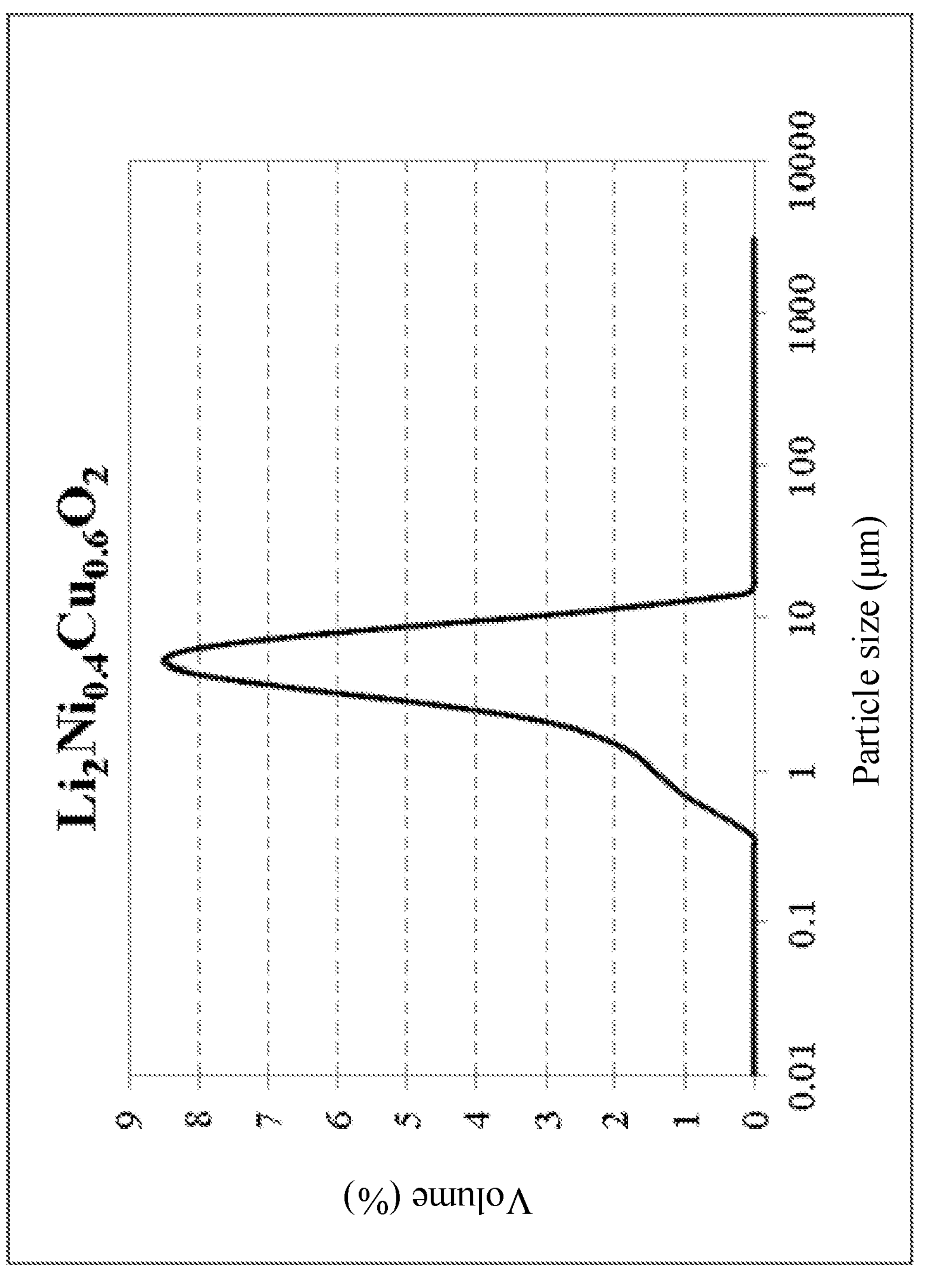
FIG. 8 is a particle size distribution diagram of a lithium supplement according to Example 1 of this application.

FIG. 8 shows a diagram of a particle size distribution of the lithium supplement according to Example 1 of this application. It can be seen that $D_v50$ of the lithium supplement in Example 1 was 5 μm.

6. Measurement of Each Element Concentration of Lithium Supplement

The plasma emission spectrometer with model ICAP7400 of Thermo Fisher Scientific, USA, was used for measurement by the ICP method. The specific method and principle were as follows: 2 g of lithium supplement was taken and vaporized in high-energy plasma and then ionized. In this process, all elements had their specific spectral lines and measured by using an electron multiplier, which could quantitatively analyze chemical composition elements in the lithium supplement.

Performance Test of Lithium Secondary Battery

1. Cycling Performance Test for Lithium Secondary Batteries

At 25° C., each of the lithium secondary batteries in the examples and comparative examples was charged to a charge cutoff voltage (LFP positive electrode: 3.65 V and NCM523 positive electrode: 4.25 V) with a constant current at 1 C rate, then charged at a constant voltage until the current was ≤0.05 C, and left standing for 5 minutes, then discharged to a discharge cutoff voltage (LFP positive electrode: 2.5 V and NCM523 positive electrode: 2.8 V) with a constant current at 1 C rate, and left standing for 5 minutes. This was one charge and discharge cycle. The batteries were subjected to charge and discharge cycling until the battery capacity was decayed to 80%. The number of cycles at that point was the cycling performance of the batteries at 25° C. Results are shown in Table 1 and Table 2 below.

2. Storage Self-Discharge Test of Lithium Secondary Battery

Figure 9:
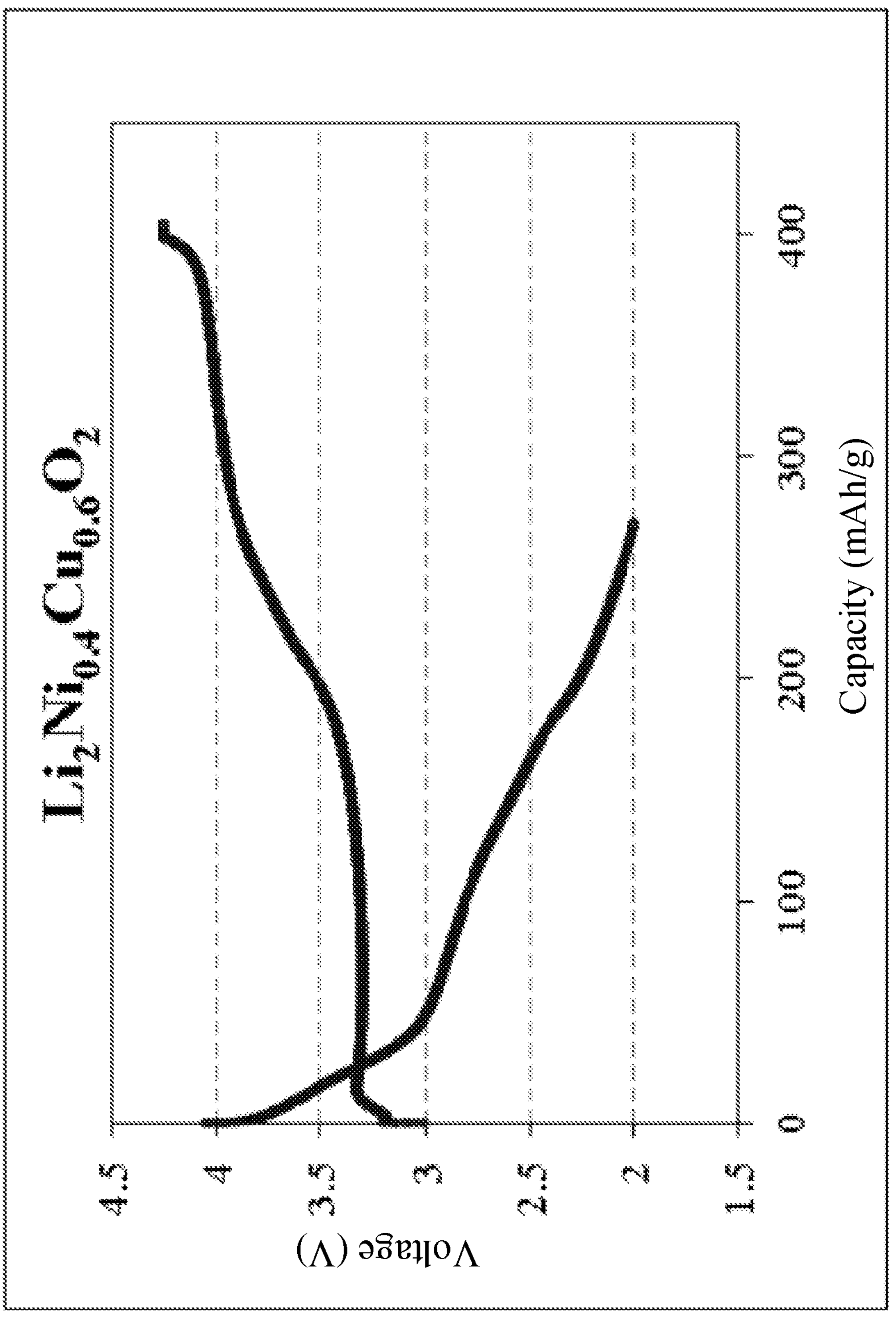
FIG. 9 is curves showing a change in capacity of a lithium secondary battery in charge and discharge according to Example 1 of this application.

At 25° C., each of the lithium secondary batteries in examples and comparative examples was charged to 50% capacity with a constant current at 1 C rate, stored at room temperature for 1 month, then discharged to a discharge cut-off voltage (LFP positive electrode: 2.5 V and NCM523 positive electrode: 2.8 V) with a constant current at 1 C rate, and left standing for 5 minutes. This was a one-month storage self-discharge test. A difference between the discharge capacity before storage and the discharge capacity after one month of storage/the discharge capacity before storage=self-discharge rate per month of the battery. Results are shown in Table 1 and Table 2 below. FIG. 9 is curves showing a change in capacity of a lithium secondary battery in charge and discharge according to Example 1 of this application.

TABLE 1

| | | Lithium supplement | | | | | | Lithium secondary battery | |
|---|---|---|---|---|---|---|---|---|---|
| Example | Positive electrode active substance | Compound L | $I_1/I_2$ | Total percentage of free lithium | pH value | $D_v50$ (μm) | Water concentration (ppm) | Cycle life (cls to 80% SOH) at 25° C. | One-month storage self-discharge rate at 25° C. |
| 1 | LFP | $Li_2Ni_{0.4}Cu_{0.6}O_2$ | 0.01% | 0.3% | 12 | 5 | 100 | 6020 | 2.25% |
| 2 | LFP | $Li_2Ni_{0.4}Cu_{0.6}O_2$ | 0.05% | 0.3% | 12 | 5 | 100 | 5820 | 2.40% |
| 3 | LFP | $Li_2Ni_{0.4}Cu_{0.6}O_2$ | 0.07% | 0.3% | 12 | 5 | 100 | 5630 | 2.65% |
| 4 | LFP | $Li_2Ni_{0.4}Cu_{0.6}O_2$ | 0.10% | 0.3% | 12 | 5 | 100 | 5250 | 2.80% |
| 5 | LFP | $Li_2Ni_{0.4}Cu_{0.55}Mg_{0.05}O_2$ | 0.01% | 0.3% | 12 | 5 | 100 | 6008 | 2.25% |
| 6 | NCM523 | $Li_2Ni_{0.4}Cu_{0.6}O_2$ | 0.01% | 0.3% | 12 | 5 | 100 | 2080 | 3.24% |
| 7 | LFP | $Li_2Ni_{0.1}Cu_{0.9}O_2$ | 0.10% | 0.3% | 12 | 5 | 100 | 5698 | 2.48% |
| 8 | LFP | $Li_2Ni_{0.2}Cu_{0.8}O_2$ | 0.10% | 0.3% | 12 | 5 | 100 | 5930 | 2.32% |
| 9 | LFP | $Li_2Ni_{0.6}Cu_{0.4}O_2$ | 0.10% | 0.3% | 12 | 5 | 100 | 5975 | 2.28% |
| 10 | LFP | $Li_2Ni_{0.9}Cu_{0.1}O_2$ | 0.10% | 0.3% | 12 | 5 | 100 | 5755 | 2.54% |
| D1 | LFP | / | / | / | / | / | / | 4530 | 2.35% |
| D2 | NCM523 | / | / | / | / | / | / | 1830 | 3.22% |
| D3 | LFP | $Li_2Ni_{0.4}Cu_{0.6}O_2$ | 0.15% | 0.3% | 12 | 5 | 100 | 4860 | 3.10% |
| D4 | NCM523 | $Li_2Ni_{0.4}Cu_{0.6}O_2$ | 0.15% | 0.3% | 12 | 5 | 100 | 1950 | 3.36% |

It can be seen from Table 1 that, compared with Comparative Examples 1 and 2 without using the lithium supplement, the lithium secondary battery including the lithium supplement of this application had significantly improved cycle life at 25° C. and had a lower one-month storage self-discharge rate at 25° C. In Comparative Examples 3 and 4, an appropriate amount of lithium supplement was added to the positive electrode, but the $I_1/I_2$ of the lithium supplement was higher than 0.1%, indicating that the lithium supplement has lower crystallinity and excessively high content of surface impurity phase. Therefore, compared with the lithium secondary batteries without the lithium supplement in Comparative Examples 1 and 2, the lithium secondary batteries in Comparative Examples 3 and 4 have improved cycling performance to some extent, but the self-discharge rates of the batteries were still high, which made the batteries prone to capacity decay during long-term storage.

Example 11

The lithium secondary battery of this application was prepared according to the method in Example 1 except that in step S1 of preparing the lithium supplement in this example, a molar ratio of Li, Ni, and Cu was 2.12:0.4:0.6. Compositions and parameters of the prepared lithium supplement are given in Table 2 below.

Example 12

The lithium secondary battery of this application was prepared according to the method in Example 1 except that in step S1 of preparing the lithium supplement in this example, a molar ratio of Li, Ni, and Cu was 2.2:0.4:0.6. Compositions and parameters of the prepared lithium supplement are given in Table 2 below.

Example 13

The lithium secondary battery of this application was prepared according to the method in Example 1 except that in step S1 of preparing the lithium supplement in this example, a molar ratio of Li, Ni, and Cu was 2.4:0.4:0.6. Compositions and parameters of the prepared lithium supplement are given in Table 2 below.

Example 14

The lithium secondary battery of this application was prepared according to the method in Example 1 except that in step S1 of preparing the lithium supplement in this example, a molar ratio of Li, Ni, and Cu was 2.5:0.4:0.6. Compositions and parameters of the prepared lithium supplement are given in Table 2 below.

TABLE 2

| | | Lithium supplement | | | | | | | Lithium secondary battery | |
|---|---|---|---|---|---|---|---|---|---|---|
| | | | | | | | | | | One-month storage |
| Example | Positive electrode active substance | Compound L | $I_1/I_2$ | Total percentage of free lithium | pH value | $D_v50$ (μm) | Water concentration (ppm) | Cycle life (cls to 80% SOH) at 25° C. | self-discharge rate at 25° C. |
| 1 | LFP | $Li_2Ni_{0.4}Cu_{0.6}O_2$ | 0.01% | 0.3% | 12 | 5 | 100 | 6020 | 2.25% |
| 11 | LFP | $Li_2Ni_{0.4}Cu_{0.6}O_2$ | 0.01% | 1% | 12 | 5 | 100 | 5850 | 2.38% |
| 12 | LFP | $Li_2Ni_{0.4}Cu_{0.6}O_2$ | 0.01% | 3% | 12 | 5 | 100 | 5660 | 2.66% |
| 13 | LFP | $Li_2Ni_{0.4}Cu_{0.6}O_2$ | 0.01% | 5% | 12 | 5 | 100 | 5350 | 2.82% |
| 14 | LFP | $Li_2Ni_{0.4}Cu_{0.6}O_2$ | 0.01% | 6% | 12 | 5 | 100 | 5018 | 2.91% |

In this application, the total percentage of free lithium contained in the lithium supplement was adjusted by changing a relative concentration of element Li and other elements in step S1 of preparing the lithium supplement. It can be seen from Table 2 that when the total percentage of free lithium of the lithium supplement was the indicated value, the active lithium content and usage rate in the lithium supplement could be effectively improved, thereby helping improve extractable capacity of the lithium supplement. The lithium supplement had high electrochemical stability during charging and discharging process of the battery, which could further reduce the self-discharge rate of the battery.

Example 15

The lithium secondary battery of this application was prepared according to the method in Example 1 except that in step S4 of preparing the lithium supplement in this example, the wash time with anhydrous ethanol was 2 h. Compositions and parameters of the prepared lithium supplement are given in Table 3 below.

Example 16

The lithium secondary battery of this application was prepared according to the method in Example 1 except that in step S4 of preparing the lithium supplement in this example, the wash time with anhydrous ethanol was 1 h. Compositions and parameters of the prepared lithium supplement are given in Table 3 below.

Example 17

The lithium secondary battery of this application was prepared according to the method in Example 1 except that in step S4 of preparing the lithium supplement in this example, the wash time with anhydrous ethanol was 0.8 h. Compositions and parameters of the prepared lithium supplement are given in Table 3 below.

Example 18

The lithium secondary battery of this application was prepared according to the method in Example 1 except that in step S4 of preparing the lithium supplement in this example, the wash time with anhydrous ethanol was 0.2 h.

Compositions and parameters of the prepared lithium supplement are given in Table 3 below.

Example 19

The lithium secondary battery of this application was prepared according to the method in Example 1 except that in step S4 of preparing the lithium supplement in this example, the wash time with anhydrous ethanol was 0.1 h. Compositions and parameters of the prepared lithium supplement are given in Table 3 below.

Example 20

The lithium secondary battery of this application was prepared according to the method in Example 1 except that in step S4 of preparing the lithium supplement in this example, the wash time with anhydrous ethanol was 0 h. Compositions and parameters of the prepared lithium supplement are given in Table 3 below.

TABLE 3

| | | Lithium supplement | | | | | | Lithium secondary battery | |
|---|---|---|---|---|---|---|---|---|---|
| Example | Positive electrode active substance | Compound L | $I_1/I_2$ | Total percentage of free lithium | pH value | $D_v50$ (μm) | Water concentration (ppm) | Cycle life (cls to 80% SOH) at 25° C. | One-month storage self-discharge rate at 25° C. |
| 1 | LFP | $Li_2Ni_{0.4}Cu_{0.6}O_2$ | 0.01% | 0.3% | 12 | 5 | 100 | 6020 | 2.25% |
| 15 | LFP | $Li_2Ni_{0.4}Cu_{0.6}O_2$ | 0.01% | 0.3% | 10.5 | 5 | 100 | 4960 | 2.95% |
| 16 | LFP | $Li_2Ni_{0.4}Cu_{0.6}O_2$ | 0.01% | 0.3% | 11 | 5 | 100 | 5710 | 2.65% |
| 17 | LFP | $Li_2Ni_{0.4}Cu_{0.6}O_2$ | 0.01% | 0.3% | 11.5 | 5 | 100 | 5920 | 2.40% |
| 18 | LFP | $Li_2Ni_{0.4}Cu_{0.6}O_2$ | 0.01% | 0.3% | 12.5 | 5 | 100 | 5810 | 2.52% |
| 19 | LFP | $Li_2Ni_{0.4}Cu_{0.6}O_2$ | 0.01% | 0.3% | 13 | 5 | 100 | 5625 | 2.72% |
| 20 | LFP | $Li_2Ni_{0.4}Cu_{0.6}O_2$ | 0.01% | 0.3% | 13.5 | 5 | 100 | 5210 | 2.88% |

In this application, after the lithium supplement was washed with absolute ethanol for a period of time, residual lithium precipitated on the surface of the lithium supplement during preparation could be taken away by the detergent, so that its pH value was adjusted. It can be seen from Table 3 that when the pH value of the lithium supplement was the indicated value, an active lithium retention rate inside the lithium supplement was relatively high, which helped further improving gram capacity of the lithium supplement.

Examples 21-27

The lithium secondary batteries of this application were prepared according to the method in Example 1 except that in step S3 of preparing the lithium supplement in Examples 18-23, the crushed and graded products have different median particle sizes $D_v50$. Compositions and parameters of the prepared lithium supplement are given in Table 4 below.

TABLE 4

| | | Lithium supplement | | | | | | Lithium secondary battery | |
|---|---|---|---|---|---|---|---|---|---|
| Example | Positive electrode active substance | Compound L | $I_1/I_2$ | Total percentage of free lithium | pH value | $D_v50$ (μm) | Water concentration (ppm) | Cycle life (cls to 80% SOH) at 25° C. | One-month storage self-discharge rate at 25° C. |
| 1 | LFP | $Li_2Ni_{0.4}Cu_{0.6}O_2$ | 0.01% | 0.3% | 12 | 5 | 100 | 6020 | 2.25% |
| 21 | LFP | $Li_2Ni_{0.4}Cu_{0.6}O_2$ | 0.01% | 0.3% | 12 | 1 | 100 | 5530 | 2.62% |
| 22 | LFP | $Li_2Ni_{0.4}Cu_{0.6}O_2$ | 0.01% | 0.3% | 12 | 2 | 100 | 5610 | 2.68% |
| 23 | LFP | $Li_2Ni_{0.4}Cu_{0.6}O_2$ | 0.01% | 0.3% | 12 | 3 | 100 | 5845 | 2.72% |
| 24 | LFP | $Li_2Ni_{0.4}Cu_{0.6}O_2$ | 0.01% | 0.3% | 12 | 6 | 100 | 5940 | 2.75% |
| 25 | LFP | $Li_2Ni_{0.4}Cu_{0.6}O_2$ | 0.01% | 0.3% | 12 | 8 | 100 | 5720 | 2.79% |
| 26 | LFP | $Li_2Ni_{0.4}Cu_{0.6}O_2$ | 0.01% | 0.3% | 12 | 10 | 100 | 5420 | 2.82% |
| 27 | LFP | $Li_2Ni_{0.4}Cu_{0.6}O_2$ | 0.01% | 0.3% | 12 | 12 | 100 | 5270 | 2.87% |

In this application, the final particle size distribution of the lithium supplement could be controlled by grading settings of a crushing device. It can be seen from Table 4 that when the median particle size by volume of the lithium supplement was within the above range, excessive loss and relatively low yield of the lithium supplement during crushing could be avoided; and the surface area of the lithium supplement was controlled, stability of the lithium supplement in the positive electrode slurry and an active lithium extraction rate of the lithium supplement in the battery were improved, thereby improving extractable capacity of the lithium supplement and kinetics of the battery.

Example 28

The lithium secondary battery of this example was prepared according to the method in Example 1 except that in step S4 of preparing the lithium supplement in this example, the drying time after washing was 10 h. Compositions and parameters of the prepared lithium supplement are given in Table 5 below.

Example 29

The lithium secondary battery of this example was prepared according to the method in Example 1 except that in step S4 of preparing the lithium supplement in this example, the drying time after washing was 8 h. Compositions and parameters of the prepared lithium supplement are given in Table 5 below.

Example 30

The lithium secondary battery of this example was prepared according to the method in Example 1 except that in step S4 of preparing the lithium supplement in this example, the drying time after washing was 6 h. Compositions and parameters of the prepared lithium supplement are given in Table 5 below.

Example 31

The lithium secondary battery of this example was prepared according to the method in Example 1 except that in step S4 of preparing the lithium supplement in this example, the drying time after washing was 2 h. Compositions and parameters of the prepared lithium supplement are given in Table 5 below.

Example 32

The lithium secondary battery of this example was prepared according to the method in Example 1 except that in step S4 of preparing the lithium supplement in this example, the drying time after washing was 1 h. Compositions and parameters of the prepared lithium supplement are given in Table 5 below.

TABLE 5

| | | Lithium supplement | | | | | | Lithium secondary battery | |
|---|---|---|---|---|---|---|---|---|---|
| Example | Positive electrode active substance | Compound L | $I_1/I_2$ | Total percentage of free lithium | pH value | $D_v50$ (μm) | Water concentration (ppm) | Cycle life (cls to 80% SOH) at 25° C. | One-month storage self-discharge rate at 25° C. |
| 1 | LFP | $Li_2Ni_{0.4}Cu_{0.6}O_2$ | 0.01% | 0.3% | 12 | 5 | 100 | 6020 | 2.25% |
| 28 | LFP | $Li_2Ni_{0.4}Cu_{0.6}O_2$ | 0.01% | 0.3% | 12 | 5 | 200 | 5830 | 2.45% |
| 29 | LFP | $Li_2Ni_{0.4}Cu_{0.6}O_2$ | 0.01% | 0.3% | 12 | 5 | 300 | 5710 | 2.58% |
| 30 | LFP | $Li_2Ni_{0.4}Cu_{0.6}O_2$ | 0.01% | 0.3% | 12 | 5 | 500 | 5605 | 2.75% |
| 31 | LFP | $Li_2Ni_{0.4}Cu_{0.6}O_2$ | 0.01% | 0.3% | 12 | 5 | 800 | 5430 | 2.96% |
| 32 | LFP | $Li_2Ni_{0.4}Cu_{0.6}O_2$ | 0.01% | 0.3% | 12 | 5 | 900 | 5140 | 2.92% |

In this application, the water concentration of the lithium supplement was controlled by controlling the drying time after washing. When the water concentration of the lithium supplement was within the above range, the lithium secondary battery has good cycle life and low self-discharge rate. Preferably, the water concentration of the lithium supplement was controlled within 500 ppm.

Examples 33-35

The lithium secondary batteries of this example were prepared according to the method in Example 1 except that the positive electrode active substances in these examples used materials with different pH values. Compositions and parameters of the prepared positive electrode active substances and lithium supplements are shown in Table 6 below.

TABLE 6

| | Positive electrode active substance | | Lithium supplement | | | | | | Lithium secondary battery | |
|---|---|---|---|---|---|---|---|---|---|---|
| Example | Composition of active substance | pH value | Compound L | $I_1/I_2$ | Total percentage of free lithium | pH value | $D_v50$ (μm) | Water concentration (ppm) | Cycle life (cls to 80% SOH) at 25° C. | One-month storage self-discharge rate at 25° C. |
| 6 | NCM523 | 11.2 | $Li_2Ni_{0.4}Cu_{0.6}O_2$ | 0.01% | 0.3% | 12 | 5 | 100 | 2180 | 3.14% |
| 33 | NCM523 | 11.6 | $Li_2Ni_{0.4}Cu_{0.6}O_2$ | 0.01% | 0.3% | 12 | 5 | 100 | 2080 | 3.24% |
| 34 | NCM622 | 11.8 | $Li_2Ni_{0.4}Cu_{0.6}O_2$ | 0.01% | 0.3% | 12 | 5 | 100 | 1960 | 3.36% |
| 35 | NCM811 | 12.1 | $Li_2Ni_{0.4}Cu_{0.6}O_2$ | 0.01% | 0.3% | 12 | 5 | 100 | 1870 | 3.47% |

In this application, when the positive electrode active substance was a lithium nickel cobalt manganese metal oxide and the lithium supplement was applied to the positive electrode plates of the ternary positive electrode active substances with different pH values, it could be found that when pHs of the lithium supplement and the ternary positive electrode active substance satisfied $pH_L \leq 1.5 \times pH_c$, and further $pH_L \leq 1.1 \times pH_c$, the lithium supplement could further improve extractable capacity in the battery, and the battery has prolonged cycle life and effectively reduced storage self-discharge rate.

A person of ordinary skill in the art can understand that the foregoing embodiments are only some specific embodiments for implementing this application, and in practical applications, various changes and modifications in forms and details can be made to the foregoing embodiments and fall within the protection scope of this application.

What is claimed is:

1. A lithium supplement for lithium secondary batteries, wherein the lithium supplement comprises a compound L having a molecular formula of $Li_xNi_aCu_{1-a-b}M_bO_2$, wherein $1 \leq x \leq 2$, $0<a<1$, and $0<b<0.1$, and M is selected from one or more of Zn, Sn, Mg, Fe, and Mn;

wherein an XRD pattern of the lithium supplement shows a first diffraction peak at a diffraction angle 2θ of 42°-44° and a second diffraction peak at a diffraction angle 2θ of 25°-27°, a diffraction intensity of the first diffraction peak is $I_1$, a diffraction intensity of the second diffraction peak is $I_2$, and $I_1/I_2<0.1\%$ holds, and wherein the first diffraction peak corresponds to a diffraction peak of nickel oxide on a (200) crystal plane, and the second diffraction peak corresponds to a diffraction peak of the compound L on a (100) crystal plane.

2. The lithium supplement according to claim 1, wherein based on total weight of the lithium supplement, a percentage of free lithium contained in the lithium supplement is ≤5 wt %.

3. The lithium supplement according to claim 2, wherein the free lithium comprises $Li_2CO_3$ and LiOH.

4. The lithium supplement according to claim 1, wherein pH of the lithium supplement is denoted as $pH_L$, and $11 \leq pH_L \leq 13$.

5. The lithium supplement according to claim 1, wherein a water concentration of the lithium supplement is not higher than 800 ppm.

6. The lithium supplement according to claim 1, wherein a median particle size by volume $D_v50$ of the lithium supplement is 2 μm-10 μm.

7. The lithium supplement according to claim 1, wherein, in the molecular formula of the compound L, $0.1 \leq a \leq 0.9$.

8. The lithium supplement according to claim 1, wherein the compound L is $Li_2Ni_{0.4}Cu_{0.55}Mg_{0.05}O_2$.

9. The lithium supplement according to claim 1, wherein the lithium supplement further comprises a coating material on at least partial surface of the compound L, and the coating material is selected from one or more of metal fluoride, oxide, and phosphate; and the metal fluoride is selected from $AlF_3$; the oxide is selected from one or more of $V_2O_5$, $Al_2O_3$, $ZrO_2$, $TiO_2$, ZnO, $SiO_2$, and $B_2O_3$; and the phosphate is selected from one or more of $AlPO_4$, $FePO_4$, $Co_3(PO_4)_2$, and $Ni_3(PO_4)_2$.

10. A preparation method of the lithium supplement for lithium secondary batteries according to claim 1, the method comprising the following steps:

S1: weighing a lithium source, a nickel source, a copper source, and an M source, and mixing them and then performing ball milling, wherein a molar ratio of Li, Ni, Cu, and Mis c:a:(1-a-b):b, $2 \leq c \leq 3$, $0<a<1$, and $0<b<0.1$, and M is selected from one or more of Zn, Sn, Mg, Fe, and Mn; and S2: sintering the ball-milled mixture to obtain the lithium supplement.

11. A lithium secondary battery, wherein the lithium secondary battery comprises a positive electrode containing the lithium supplement according to claim 1; and based on a total mass of a positive electrode active substance, a mass percentage of the lithium supplement is 0.1 wt %-10 wt %.

12. The lithium secondary battery according to claim 11, wherein the positive electrode active substance comprises at least one of the compounds expressed by formula (I) to formula (III):

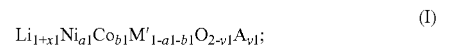

$$Li_{1+x1}Ni_{a1}Co_{b1}M'_{1-a1-b1}O_{2-y1}A_{y1}; \quad (I)$$

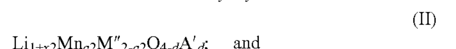

$$Li_{1+x2}Mn_{a2}M''_{2-a2}O_{4-d}A'_d; \quad \text{and} \quad (II)$$

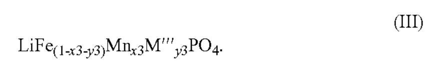

$$LiFe_{(1-x3-y3)}Mn_{x3}M'''_{y3}PO_4. \quad (III)$$

wherein in the formula (I), $-0.1 \leq x1 \leq 0.2$, $0<a1<1$, $0 \leq b1 \leq 1$, $0<a1+b1<1$, and $0 \leq y1<0.2$, M' is one or more of Mn, Fe, Cr, Ti, Zn, V, Al, Zr, and Ce, and A comprises one or more of S, N, F, Cl, Br, and I;

wherein in the formula (II), $-0.1 \leq x2 \leq 0.2$, 0<a232, and $0 \leq d<1$, M" comprises one or more of Ni, Fe, Cr, Ti, Zn, V, Al, Mg, Zr, and Ce, and A' comprises one or more of S, N, F, Cl, Br, and I;

wherein in the formula (III), $0 \leq x3 \leq 1$ and $0 \leq y3 \leq 0.1$, and M" is selected from one or more of transition metal elements other than Fe and Mn and non-transition metal elements.

13. The lithium secondary battery according to claim 12, wherein when the positive electrode active substance contains the compound expressed by the formula (I), pH of the compound expressed by the formula (I) is denoted as $pH_c$, pH of the lithium supplement is denoted as $pH_L$, and $pH_c \leq pH_L$.

14. A battery module, comprising the lithium secondary battery according to claim 11.

15. A battery pack, comprising the battery module according to claim 14.

16. A lithium supplement for lithium secondary batteries, wherein the lithium supplement comprises a compound L having a molecular formula of $Li_xNi_aCu_{1-a-b}M_bO_2$ and a coating material on at least partial surface of the compound L, wherein $1 \leq x \leq 2$, $0<a<1$, and $0 \leq b<0.1$, and M is selected from one or more of Zn, Sn, Mg, Fe, and Mn;

wherein an XRD pattern of the lithium supplement shows a first diffraction peak at a diffraction angle 2θ of 42°-44° and a second diffraction peak at a diffraction angle 2θ of 25°-27°, a diffraction intensity of the first diffraction peak is $I_1$, a diffraction intensity of the second diffraction peak is $I_2$, and $I_1/I_2<0.1\%$ holds;

wherein the first diffraction peak corresponds to a diffraction peak of nickel oxide on a (200) crystal plane, and the second diffraction peak corresponds to a diffraction peak of the compound L on a (100) crystal plane; and wherein the coating material is selected from one or more of $AlF_3$, $V_2O_5$, $ZrO_2$, $TiO_2$, ZnO, $SiO_2$, $B_2O_3$, $AlPO_4$, $FePO_4$, $Co_3$ $(PO_4)_2$, and $Ni_3(PO_4)_2$.

* * * * *